(12) United States Patent
Feldmeier

(10) Patent No.: US 8,667,989 B1
(45) Date of Patent: Mar. 11, 2014

(54) ASEPTIC OR SANITARY TOP HAT DIAPHRAGM VALVE

(71) Applicant: Robert H. Feldmeier, Fayetteville, NY (US)

(72) Inventor: Robert H. Feldmeier, Fayetteville, NY (US)

(73) Assignee: Feldmeier Equipment, Inc., Syracuse, NY (US)

( * ) Notice: Subject to any disclaimer, the term of this patent is extended or adjusted under 35 U.S.C. 154(b) by 0 days.

(21) Appl. No.: 13/946,001

(22) Filed: Jul. 19, 2013

(51) Int. Cl.
F16K 7/17 (2006.01)
F16K 11/22 (2006.01)
F16K 31/12 (2006.01)

(52) U.S. Cl.
CPC . *F16K 7/17* (2013.01); *F16K 11/22* (2013.01); *F16K 31/12* (2013.01)
USPC ........................... 137/885; 251/63.5; 251/331

(58) Field of Classification Search
CPC ............ F16K 7/17; F16K 11/22; F16K 31/12
USPC ........................ 137/885; 251/63.5, 331, 335.2
See application file for complete search history.

(56) References Cited

U.S. PATENT DOCUMENTS

| | | | | |
|---|---|---|---|---|
| 3,464,447 | A | * | 9/1969 | Jones ............................ 137/883 |
| 3,838,707 | A | | 10/1974 | Wachowitz, Jr. |
| 4,175,591 | A | * | 11/1979 | Welker .......................... 137/883 |
| 4,280,532 | A | * | 7/1981 | Bible et al. ..................... 137/882 |
| 5,090,659 | A | * | 2/1992 | Bronnert ....................... 251/61.1 |
| 5,232,023 | A | * | 8/1993 | Zimmerly ................... 137/637.2 |
| 5,479,955 | A | * | 1/1996 | Roodvoets et al. ......... 137/15.16 |
| 7,077,163 | B2 | * | 7/2006 | Schwarz ....................... 137/883 |
| 7,637,284 | B1 | | 12/2009 | Feldmeier |
| 7,744,060 | B2 | * | 6/2010 | Sneh ................................ 251/46 |
| 2011/0260091 | A1 | | 10/2011 | Feldmeier |

OTHER PUBLICATIONS

Bellofram Corporation, BRD Bellofram Rolling Diaphragm Design Manual, Dec. 2006.

* cited by examiner

*Primary Examiner* — John Fox
(74) *Attorney, Agent, or Firm* — Bernhard P. Molldrem, Jr.

(57) ABSTRACT

An aseptic valve or sanitary valve has an elongated tubular, cylindrical valve housing, with one or more top-hat diaphragms and associated valve plugs positioned transverse to the axis of the tubular valve housing. An actuator urges the stem and head of the valve plug upward so that the associated diaphragm is urged against a valve seat to close the valve. The actuator also moves these elements downward and away from the seat to open the valve. Plural valve arrangements can be joined end to end to accommodate multiple flow paths.

8 Claims, 6 Drawing Sheets

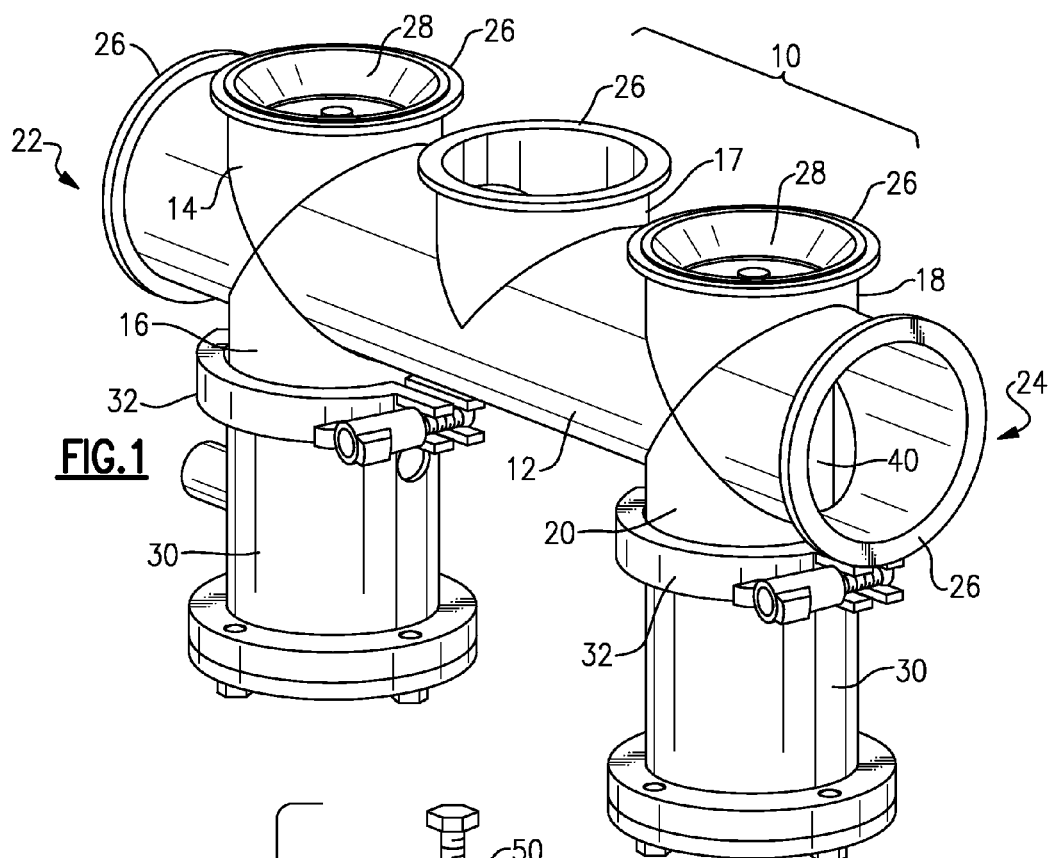
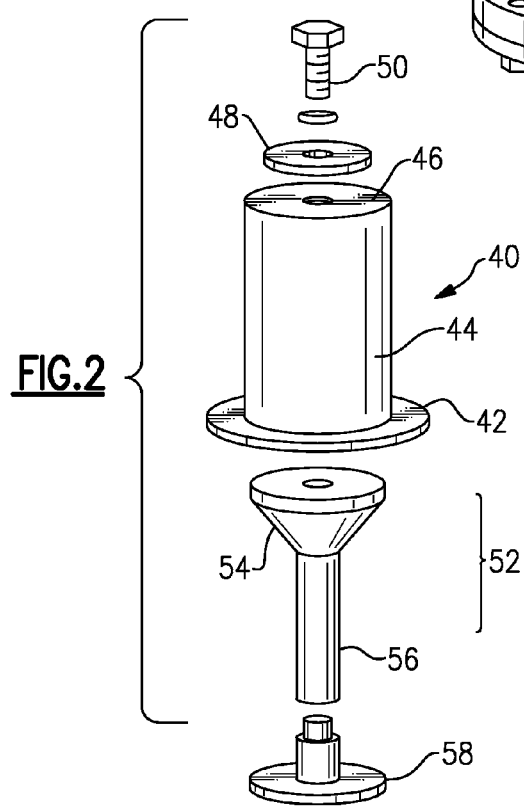

ASEPTIC OR SANITARY TOP HAT DIAPHRAGM VALVE

BACKGROUND OF THE INVENTION

This invention relates to equipment for processing of liquids that must be kept aseptic, i.e., pharmaceuticals, dairy products, other food products for human consumption, beauty products, skin care products, and the like. The invention is more particularly directed to sanitary valves of the type used in the dairy, food processing, and/or pharmaceutical industries, in which the flow of a fluid is to be regulated or diverted from one flow path to another. The invention is more directly concerned with diaphragm valves, that is, valves of the type in which a flexible membrane isolates the mechanical portions of the valve from the flow of fluid. The invention is also concerned with a diaphragm valve of simple design and which can be cleaned and sterilized in place by the flow of a cleaning liquid through the valve. Sanitary diaphragm valves of this type can be used in a milk pasteurization line e.g. as a pressure regulating valve. These valve may also be employed as a drain valve for a sanitary tank to connect the tank to subsequent stage(s) in a processing line. Moreover, it has been desired to provide a sanitary valve of a type in which multiple valves can be joined to one another to form a multiple valve for controlling fluid flow over a number of possible flow paths.

In order to ensure that the sanitary tank and conduit can be cleansed and sanitized between processes, the processing flow path, including any valves, need to be designed so that all components can be completely cleaned in place of any product by washing it and rinsing it with a cleaning fluid that must reach every point on the interior of the conduit, including every point in the valve cavities. No threaded connectors can be used anywhere that the liquid product flows, because of the difficulty in cleaning the threads. Any threads need to be sealed off and isolated from any contact with the processed fluid. In order to accommodate this requirement, the sanitary valves used in the dairy industry, food processing industries, pharmaceutical industry, have been complex and difficult to repair and maintain, and represent a significant capital expense.

Also, because pumping losses occur when the process fluids pass through a valve, it is also desirable to design the sanitary valve so that it presents a minimum of obstruction to the flow of the process fluid.

OBJECTS AND SUMMARY OF THE INVENTION

It is an object of the present invention to provide an aseptic or sanitary diaphragm valve arrangement of simple construction, capable of being cleaned in place when installed in conduits for liquid food products, pharmaceuticals, beauty care products, or any other product which must be processed under sanitary conditions. The diaphragm valve must be capable of controlling flow and/or pressure of the liquid product, but should also be of simple, reliable, and sturdy construction so as to avoid the drawbacks of the prior art.

It is another object to provide an aseptic or sanitary valve that employs a valve plug contained within a membrane that separates it from the process fluid, but with a minimum of obstruction to the flow of the fluid, and does not require complex surfaces within the valve cavity.

Another object is to provide a valve design permitting the valve to be constructed of linear design, and which is capable of combining with a similar valve to construct a multiple valve that can direct the fluid to any of a number of alternative flow paths.

It is a further object to provide a diaphragm valve that is capable of reliably opening and closing to regulate the flow of fluids in the sanitary flow path.

According to one aspect of the invention, a sanitary or aseptic diaphragm valve is provided for use in connection with the flow of a liquid food product, a pharmaceutical or other fluid that needs to be processed under sanitary or sterile conditions. The sanitary diaphragm valve is has an elongated tubular (i.e., generally cylindrical) valve body formed of an elongated tube or pipe, with flange rings at its two ends. The ends may be closed off, using a seal disk held by a clamp to the respective flange ring, or the end may be connected to a tubular conduit for the fluid, or may be connected to the tubular valve body of a similar sanitary diaphragm valve. The valve mechanism(s) are formed of an upper tube stub and a lower stub joined to opposite sides of the tubular body and positioned on a valve axis that is transverse to the longitudinal axis of the tube body, where each tube stub has a flange ring at its end. An annular valve seat is positioned within the upper tube stub. An actuator is attached onto the lower tube stub and has a movable member that is capable of motion for a limited distance along the valve axis. The actuator has a flange ring mating against the flange ring of the lower tube stub. The actuator may be controlled by compressed air, or may in some cases be manually operated.

A top hat sanitary diaphragm is formed of a flexible elastomeric material and is disposed transversely across the interior of the tubular valve body, aligned along said valve axis. The top hat diaphragm generally resembles a stove-pipe men's hat of the type worn in the nineteenth century, and has a lower annular brim portion that retained between the annular flange rings of the lower tube stub and the actuator, a cylindrical stove-pipe portion extending from the lower annular portion, along the valve axis across tubular valve body into the upper tube stub, and an upper disk portion that extends across the cylindrical portion of the diaphragm and reaches the valve seat. The diaphragm may be formed of a tough, food-grade silicone rubber.

A plug member is positioned within an interior of the top hat sanitary diaphragm. This plug member has a stem aligned along the valve axis, and has a lower end affixed onto the movable member of the actuator and also has a head portion disposed against the disk portion of the diaphragm. The action of the actuator in one direction urges the disk portion against valve seat to close the valve, and in the other direction moves the disk portion of the diaphragm away from the valve seat to open the valve.

The stem portion of the plug member should have a diameter substantially smaller than the interior of the cylindrical portion of the diaphragm, while the head portion should have a diameter that substantially matches the disk portion of the diaphragm.

The actuator, e.g., a pneumatic cylinder, favorably has an opening through its outer wall that serves the purposes of providing visible evidence of leakage if there is a failure of the diaphragm, and also permitting communication between the interior of the cylindrical portion of the top hat diaphragm and ambient air pressure outside the valve. That is, the pressure within the cylindrical part of the top hat diaphragm remains at atmospheric pressure while the pressure outside the cylindrical portion is determined by the pressure of the process fluid. Accordingly, the top hat diaphragm flattens, providing a small profile across the valve body, and minimizing any obstruction to the flow of the process fluid. The head of plug member is favorably conic in shape with its narrow end joined to the stem.

There can be a third tube stub, or further similar tube stubs on one side or another of tubular valve body at position(s) displaced from the first-mentioned valve axis and between the first and second ends of the valve body. The additional tube stub or stubs each have respective flange ring(s) at their end. These may serve as inlet or outlet ports for the fluid that is controlled by the valve.

There may be additional valve mechanisms, each with a pair of tube stubs, plug, top-hat diaphragm, valve seat and actuator, so that the valve may be employed for diverting the fluid from one flow path to another. Also two or more of these tubular-body sanitary diaphragm valves may be joined end-to-end to form a multiple valve arrangement, permitting control of the flow of the fluid over a multiple of possible flow paths.

In a favorable embodiment, the diaphragm is designed to allow for the flow of C.I.P. cleaning fluid over the internal valve surfaces during a clean-in-place cleaning operation.

In preferred embodiments of this valve, the valve actuator housing includes a leakage-evident opening through its wall, so that if a leak develops in the diaphragm, it will create a visible drop of liquid at that opening. The leakage-evident opening need not be in any specific location, but may be in a zone of the valve actuator housing that is in fluid communication with the diaphragm. In the event that a tear or perforation occurs in the diaphragm, any process liquid will flow into the space beneath and out the opening, where it will provide a visible indication of a fault.

The valve actuator can take the form of an air cylinder aligned transverse with the tubular valve body, with an air piston located within the air cylinder. This may be arranged so that compressed air holds the valve closed, or arranged to be spring-closed so that compressed air is applied to open the valve.

Tri-clamps or equivalent sanitary clamp means may be used to attach the cylinder components, actuators, connected piping, and diaphragms. The tri-clamp allows the valve to be partly disassembled for maintenance or repair on-station. The tri-clamp is a well known and available device, and need not be discussed in detail here.

In the description and claims, terms of orientation such as upper, lower, above, and below are used only for convenience in describing the invention in association with the accompanying Drawing figures. It should be understood that this diaphragm valve can be installed and operated in any of a wide variety of orientations.

The above and many other objects, features, and advantages of the arrangements of the present invention will become apparent from the ensuing detailed description of preferred embodiments of the invention, when read in connection with the accompanying Drawing.

BRIEF DESCRIPTION OF THE DRAWING

FIG. 1 is perspective view of an aseptic or sanitary top hat diaphragm valve according to one embodiment of the invention.

FIG. 2 is an assembly view of the top-hat diaphragm and associated valve plug of this embodiment.

DETAILED DESCRIPTION OF THE PREFERRED EMBODIMENT

Figure 3:
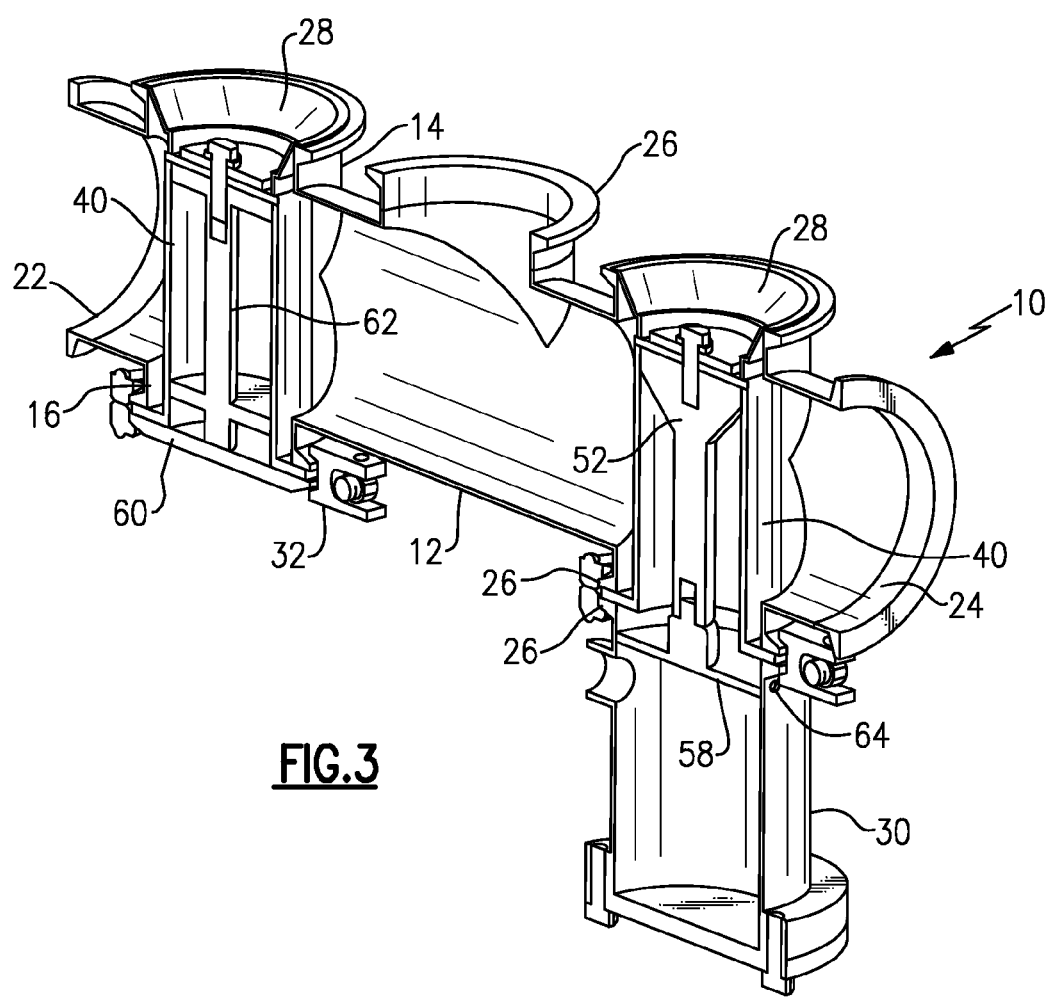
FIG. 3 is a cross sectional view the top hat diaphragm valve of FIG. 1.

With initial reference to the embodiment illustrated in FIGS. 1 to 3, an aseptic valve or sanitary tubular, top-hat diaphragm valve 10 of the present invention may be employed on a sanitary conduit, or may be employed in connection with a sanitary tank or vessel, adapted for a dairy product, another edible product such as fruit juice, sauce or soup, or a pharmaceutical product for human or veterinary use, or a cosmetic, beauty-related, or dermatological creme or liquid.

The aseptic or sanitary valve 10 of this embodiment is formed with a tubular valve body or valve housing 12, here embodied as a straight length of cylindrical tubing; here for purposes of explanation and illustration the tubular valve body 12 is oriented horizontally and defines a horizontal tube axis. There are tube stubs joined to the main valve body to serve as inlet port(s) and controlled or valved outlet ports, including a first upper tube stub 14 and first lower tube stub 16 disposed opposite one another along a valve axis (here a vertical axis) that is transverse to the main tube axis; at a distance displaced from them, a second upper tube stub 18 and second lower tube stub 20 are disposed opposite one another and are oriented along a second valve axis that is also transverse, i.e., at right angles, to the main tube axis. Between them is a third upper tube stub 17, which can serve as an un-gated inlet port. In this embodiment, the tube stubs are of the same diameter as the main tubular body 12, but that is not required for all embodiments. The tubular valve body 12 also has a left end 22 and a right end 24. At each of the tube ends 22, 24 and the ends of each of the tube stubs 14, 16, 17, 18, and 20 there is a flange ring 26 formed on the associated member, and these are adapted for fitting a Tri-Clamp or other clamping member to join that member to a pipe or another element such as an air cylinder actuator, or to another similar diaphragm valve. Favorably, the valve body and tube stubs can be three-inch inside diameter stainless steel tubing.

Valve seats 28 are fitted within the two upper tube stubs 14 and 18. An actuator 30, e.g., an air-actuated pneumatic cylinder, may be attached onto either or both of the lower tube stubs 16 and 20, using a Tri-clamp 32.

As shown in FIG. 2 (see also FIG. 5) the valve employs a diaphragm 40 that is in the shape of a top hat or a stove-pipe hat, and is formed of a suitable food-grade rubber, e.g. a silicon rubber or the equivalent. The top hat diaphragm 40 at its base has a planar annular flange 42 forming the "brim" of the hat, a cylindrical portion 44 that rises from the annular flange an forms the "crown" of the hat, with an upper disk member 46 extending across the top of the cylindrical portion 44. The brim or annular flange 42 extends outward from the base of the cylindrical portion 44 and is captured between the flange ring 26 of one of the lower tube stubs and the flange ring of an associated actuator. A stainless steel washer 58 is bolted through the top disk 46, using a bolt 50 with an associated seal ring, as shown.

As also shown in FIG. 2, a valve plug 52 extends vertically within the interior of the diaphragm cylindrical portion, with a head 54, in the shape of an inverted cone, that receives the bolt 50 and is affixed against the diaphragm top disk 46 and stainless steel washer 48. A stem 56, of narrow diameter, extends down from the narrow nose end of the cone-shaped head 54 and terminates at a piston 58 that is a part of the associated air-cylinder actuator 30.

As better shown in FIG. 3, there are seal disks 60, favorably of a food grade stainless steel, that terminate any unused openings or ports in the valve. In the embodiment to be described shortly, the seal disks 60 are used to terminate the left and right ends 22 and 24 of the tubular valve body 12. In this illustration of FIG. 3, a dummy plug 62 and an associated top hat diaphragm 40 are positioned in the left-side upper and lower tube stubs 14 and 16 to close off one unused outlet port. Here the associated lower tube stub 16 is closed off using a seal disk 60 held in place with a tri-clamp 32. A leakage-evident opening 64 is present in the lower tube stub 20 above the associated actuator 30, and this can serve to provide a visible indication of leakage of the process fluid in the event there is a perforation, tear, crack or other failure of the associated diaphragm 40. This also communicates the interior of the top hat diaphragm cylindrical portion 44 with the outside ambient, so that the pressure within the interior of the diaphragm 40 is at a pressure lower than the fluid pressure of the process fluid within the tubular valve body.

Figure 4:
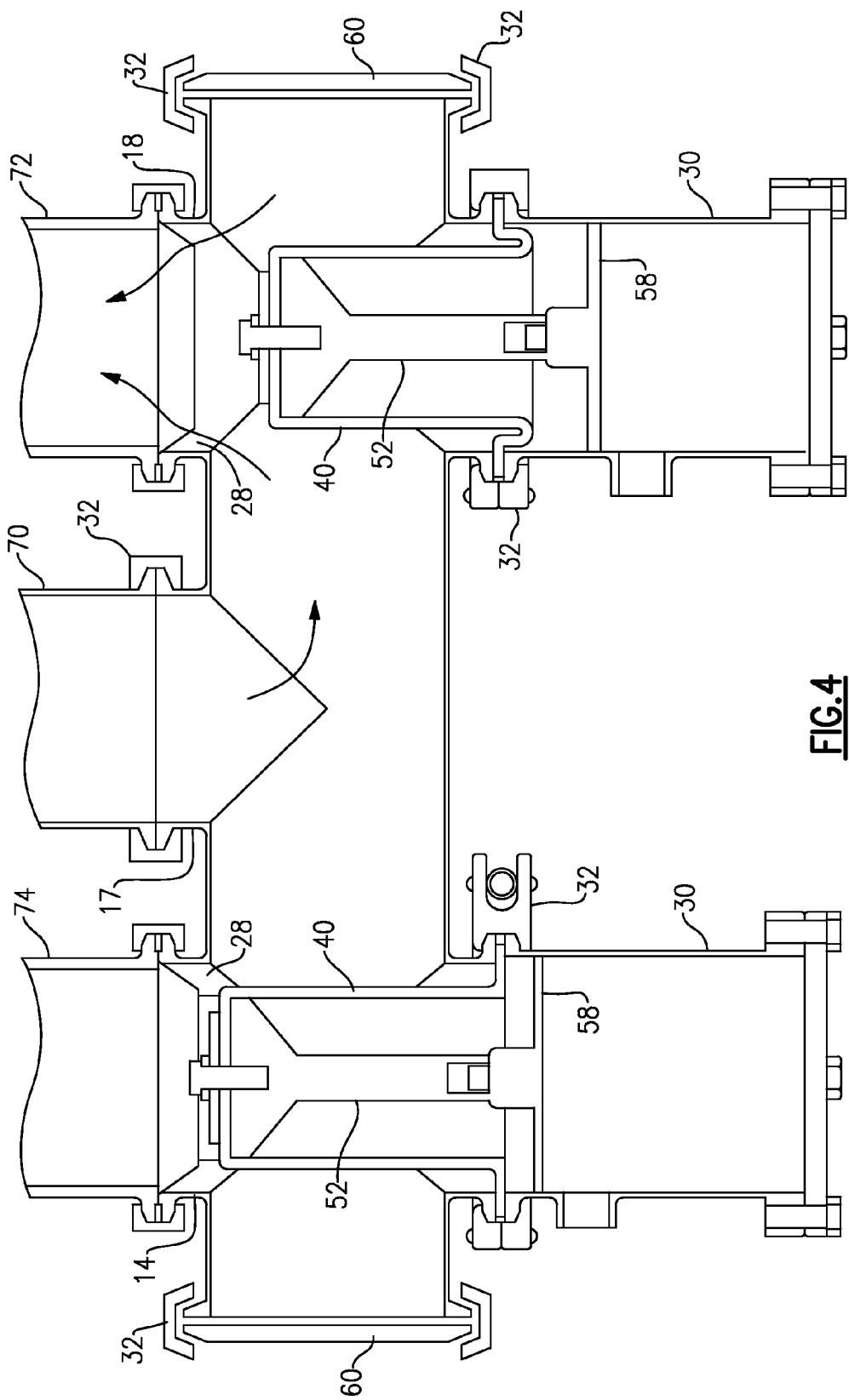
FIG. 4 is a cross sectional view of one practical implementation of the top hat diaphragm valve of FIG. 1.

A practical valve arrangement according to the present invention is shown in FIG. 4, in which the diaphragm valve 10 has an inlet pipe 70 supplying the process fluid, e.g., milk, fruit juice, soup, or a pharmaceutical, to the center tube stub 17, with a tri-clamp 32 joining the pipe 70 to the tube stub 17. A seal ring, e.g., gasket or gland, is provided between a flange ring on the pipe 70 and the flange ring 26 of the tube stub 17, but the seal ring is not shown in this view. Gated outlet pipes 72 and 74 are mounted by means of tri-clamps 32 and associated seal rings to the upper tube stubs 14 and 18, respectively. These outlet pipes 72 and 74 lead to a main flow path and a diverted flow path for the process fluid. The valve elements for the left and right gated outlet pipes 72 and 74 are each constituted by a top hat elastomeric diaphragm 40 and an associated valve plug 52, with a valve seat 28 positioned in each associated upper tube stub 14 and 18, as described earlier. The ends 22 and 24 of the tubular valve body 12 are closed off by sealing disks 60, each held in place with a respective tri-clamp.

In this illustration, the left plug 52 and diaphragm 40 are urged upward so that the diaphragm closes against the associated valve seat 28. The right plug and diaphragm are urged downward, as shown, so that the upper part of the diaphragm 40 is moved away from its associated valve seat 28, permitting flow of the process fluid, as shown by arrows in this view. In order to divert flow from the outlet tube 72 to the other outlet tube 74, compressed air is applied to the right actuator 30 to raise the piston 58 and the associated plug 52 and top hat diaphragm 40, and then air pressure is relieved from the left actuator to move the left piston 58, plug 52 and diaphragm 40 away from the left valve seat 28.

Figure 5:
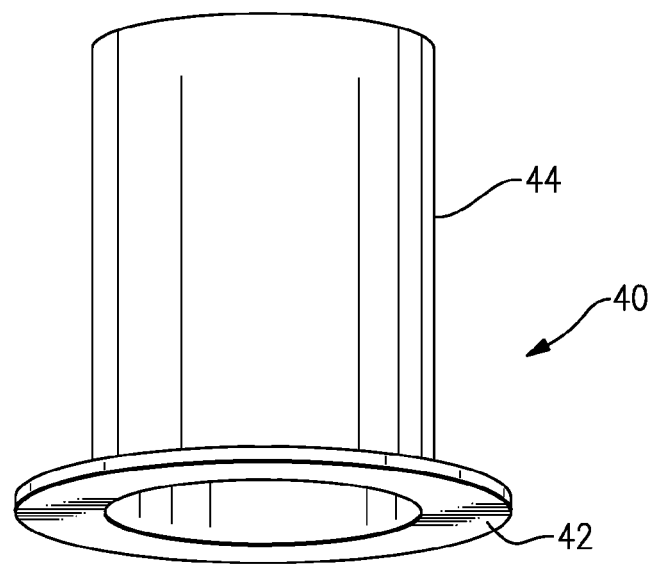
FIG. 5 is a perspective view of the top hat diaphragm of this embodiment.

FIG. 5 shows top hat diaphragm 40 so that the underside of the flange 42 is visible, showing the open base and hollow interior of the cylindrical portion 44, with the center opening into which the plug 52 is fitted.

Figure 6:
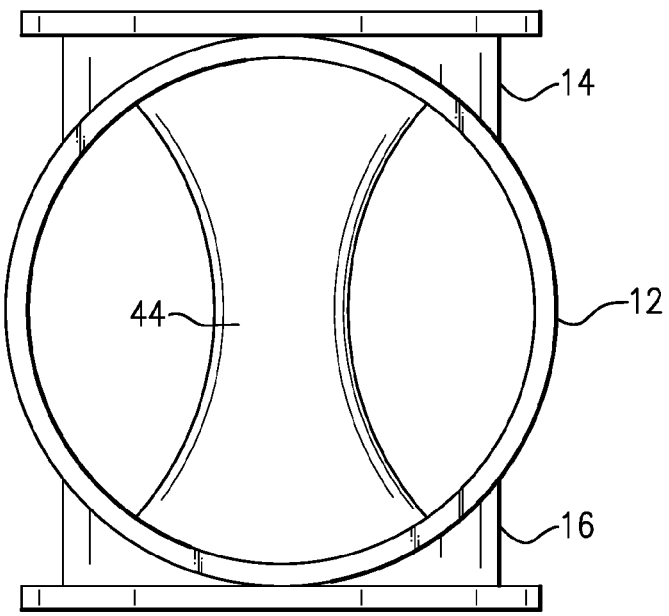
FIG. 6 is a sectional view explaining the action of this embodiment.

Because the interior space within the top hat diaphragm is open to ambient pressure, as discussed before in respect to the opening 64, the sides of the cylindrical portion 44 flatten together in the presence of the process fluid, which is under pressure while in the system. Accordingly, as shown in FIG. 6, the top hat diaphragm takes on a reduced profile in the flow direction of the process fluid, and imposes only a minimal resistance to the flow of the process fluid. The wide end of the conic head 54 holds the disc portion 46 of the diaphragm to its full width, but the narrow stem 56 allows the center part of the top hat diaphragm to flatten to a much smaller profile, as shown.

Figure 7:
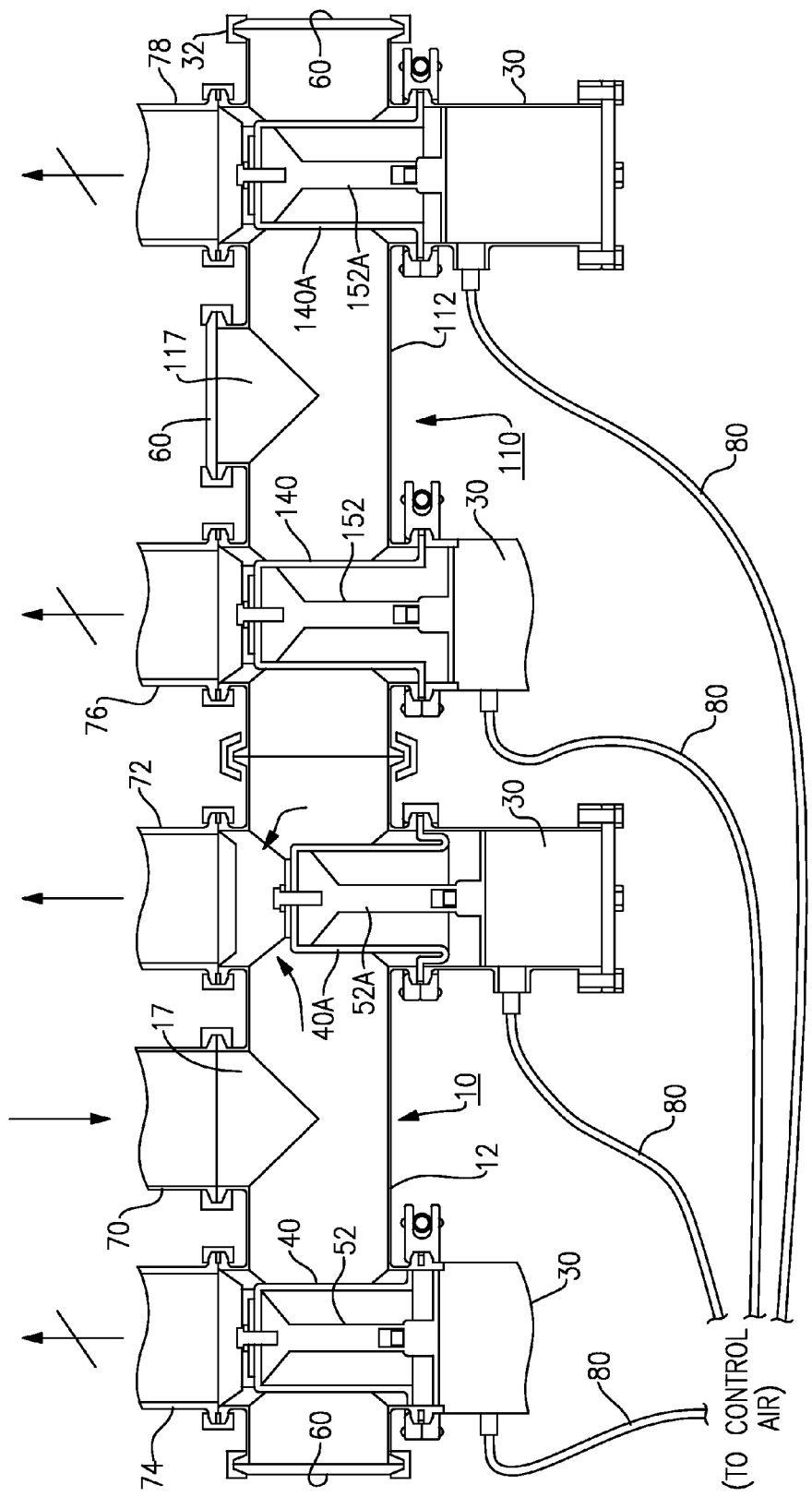
FIG. 7 illustrates an alternate implementation of the top hat diaphragm valve of FIG. 1.
Figure 8:
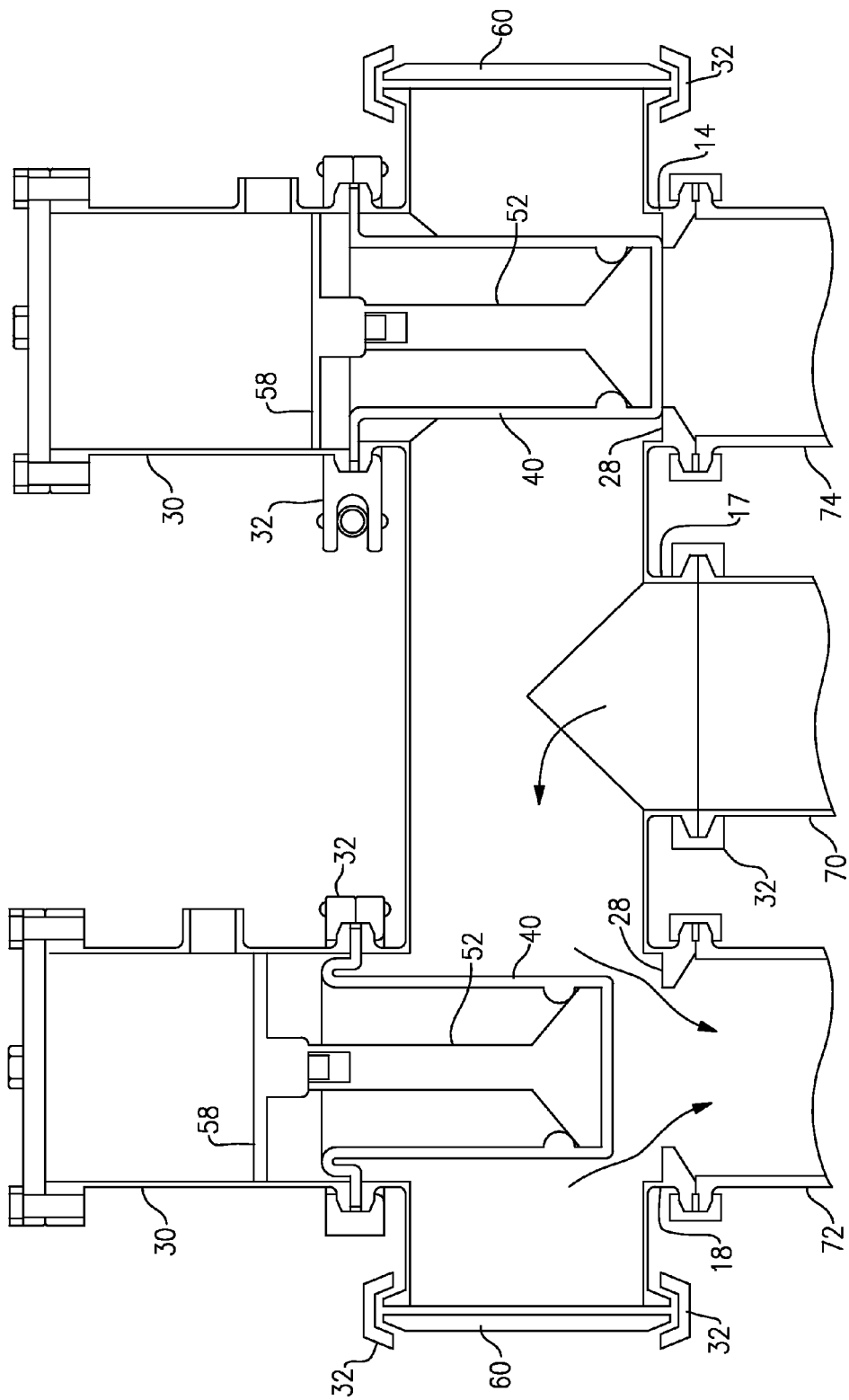
FIG. 8 is a cross sectional view of an alternative orientation of the embodiment of FIG. 4.

FIG. 7 illustrates a second of many possible configurations. In this arrangement, two of these tubular valves are joined together end-to-end to create a multiple valve, i.e., a valve with multiple alternative outflow paths. A first top-hat diaphragm valve 10 at the left is joined to a second top-hat diaphragm valve 110 at the right, with the right end 24 of the left valve 10 being joined (by use of a tri-clamp) to the left end of the right valve 110. The second valve 110 is of the same construction as the first (i.e., left) valve arrangement 10 and as shown and disclosed in respect to FIG. 4. Elements that are employed in the second valve 110 are identified with the same reference numbers as for the corresponding elements discussed earlier, but raised by 100. Sealing disks 60 are fitted onto the two outer ends of the tubular valve bodies, and a sealing disk is fitted also onto the tube stub 117, which is inactive. The inlet pipe 70 is fitted onto the inlet tube stub 17, and first through fourth outlet pipes 74, 72, 76 and 18 are fitted onto the upper tube stubs 14, 18, 114, and 118, respectively. There are four valve closure mechanisms formed respectively of diaphragm 40 and plug 52, diaphragm 40A and plug 52A, diaphragm 140 and plug 152, and diaphragm 140A and plug 152A, as shown from left to right in this view. Each plug is moved by means of a piston of an associated actuator 30 joined to the respective lower tube stub 16, 20, 116 and 120, and there are air hoses 80 leading to each actuator cylinder from a control box (not shown) that supplies control air. This illustration shows the second valve closure mechanism (plug 52A and diaphragm 40A) being drawn down to open the pathway through outlet pipe 72, with the other valve closure mechanism being urged upwards to the closed position. The supply of control air can be changed to close the flow path to outlet pipe 72 and open one (or more) of the flow paths through outlet pipes 74, 76, or 78.

Other configurations are possible without departing from the main principles of construction or operation of this diaphragm valve. The tubular valve body 12 may be of a non-circular section, i.e., oval or oblong, and although this embodiment employs straight tubing for the valve body, the valve body 12 could be curved in some embodiments. FIG. 4 illustrates an arrangement in which the valve arrangement has its actuators 30 above and the inlet and outlet tubes 70, 72, 74 beneath. The reference numbers employed here identify the same elements as in FIG. 4, and a detailed description need not be repeated.

While terms of orientations such as horizontal, vertical, upper, lower, right and left have been employed here, these are meant only for convenience in describing the invention in terms of the Drawing Figures. It should be understood that the diaphragm valve of this invention is not to be limited to any particular orientation.

While the invention has been described with reference to selected preferred embodiments, it should be understood that the invention is not limited only to those embodiments. Rather many variations are possible without departing from the scope and spirit of this invention, as defined in the appended Claims.

I claim:

1. An aseptic or sanitary top hat diaphragm valve comprising:
   an elongated tubular valve body having a longitudinal axis, with a first end and a second end, and with flange rings at each end respectively;

a first tube stub joined to one side of the tubular body and positioned on a valve axis that is transverse to said longitudinal axis, the first tube stub having a flange ring at an end thereof;

a second tube stub joined to the tubular valve body on a side thereof opposite to the first tube stub and aligned along said valve axis, with a flange ring at an end thereof;

an annular valve seat positioned within said first tube stub;

an actuator attached onto the second tube stub and having a movable member that is capable of motion for a limited distance along said valve axis, said actuator having a flange ring mating against the flange ring of said second tube stub;

a top hat sanitary diaphragm formed of a flexible elastomeric material disposed within said tubular body and being aligned along said valve axis, said top hat diaphragm including a lower annular portion retained between the annular flange rings of said second tube stub and said actuator, a cylindrical portion extending from said lower annular portion across said tubular valve body into said first tube stub, and an upper disk portion extending across the cylindrical portion and reaching said valve seat; and a plug member positioned within an interior of said top hat sanitary diaphragm, including a stem aligned along said valve axis with a lower end affixed onto the movable member of said actuator and a head portion disposed against the disk portion of said diaphragm such that by action of the actuator the disk portion is urged against said valve seat and is moved away from the valve seat.

2. The aseptic or sanitary top hat diaphragm valve according to claim 1, wherein the stem portion of said plug member has a diameter substantially smaller than the interior of the cylindrical portion of the diaphragm, and said head portion has a diameter that substantially matches the disk portion of the diaphragm.

3. The aseptic or sanitary top hat diaphragm valve according to claim 2, wherein said actuator has an opening therein permitting communication between the interior of the cylindrical portion of the top hat diaphragm and ambient air pressure outside the valve.

4. The aseptic or sanitary top hat diaphragm valve according to claim 1 further comprising a third tube stub on a side of said tubular valve body at a position displaced from said valve axis between the first and second ends of the valve body, and having a flange ring at an end thereof.

5. The aseptic or sanitary top hat diaphragm valve according to claim 1 wherein the head of said plug member is generally conic in shape with a narrow end joined to said stem.

6. The aseptic or sanitary top hat diaphragm valve according to claim 5 wherein said stem is substantially smaller in diameter than the internal surface of the cylindrical portion of the diaphragm, thus permitting the diaphragm to flatten under pressure of fluids flowing through said tubular valve body.

7. The aseptic or sanitary top hat diaphragm valve according to claim 1 further comprising a first additional tube stub joined to one side of the tubular body and positioned on a second valve axis, spaced from the first-mentioned valve axis, and transverse to said longitudinal axis, the additional tube stub having a flange ring at an end thereof;

a second additional tube stub joined to the tubular valve body on a side thereof opposite to the first tube stub and aligned along said second valve axis, with a flange ring at an end thereof;

an annular valve seat positioned within said first additional tube stub;

an additional actuator attached onto the second additional tube stub and having a movable member that is capable of motion for a limited distance along said second valve axis, said additional actuator having a flange ring mating against the flange ring of said second additional tube stub;

a second top hat sanitary diaphragm formed of a flexible elastomeric material disposed within said tubular body and being aligned along said second valve axis, said second top had diaphragm including a lower annular portion retained between the annular flange rings of said second additional tube stub and said second actuator, a cylindrical portion extending from said lower annular portion across said tubular valve body into said first tube stub, and an upper disk portion extending across the cylindrical portion thereof and reaching said valve seat; and a second plug member positioned within an interior of said second top hat sanitary diaphragm, including a stem aligned along said second valve axis with a lower end affixed onto the movable member of said additional actuator and a head portion disposed against the disk portion of said second diaphragm such that by action of the additional actuator the disk portion is urged against the associated valve seat and is moved away from such valve seat.

8. The aseptic or sanitary top hat diaphragm valve according to claim 1 further comprising a second top hat diaphragm valve that includes an elongated tubular valve body having a longitudinal axis, with a first end and a second end, and with flange rings at each end respectively; and with the first end of said second top hat diaphragm valve being joined against the second end of the first-mentioned top hat diaphragm valve, with the respective flange rings thereof being clamped together, thus forming a multiple aseptic or sanitary top hat diaphragm valve.

\* \* \* \* \*